US012746159B2

(12) United States Patent
Lee

(10) Patent No.: US 12,746,159 B2
(45) Date of Patent: Sep. 29, 2026

(54) CONTROL SYSTEM AND CONTROL METHOD FOR CONTROLLING ELECTRIC WALKING AID DEVICE

(71) Applicant: PEGATRON CORPORATION, Taipei City (TW)

(72) Inventor: Ang-Chien Lee, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 583 days.

(21) Appl. No.: 18/306,802

(22) Filed: Apr. 25, 2023

(65) Prior Publication Data

US 2023/0404823 A1 Dec. 21, 2023

(30) Foreign Application Priority Data

Jun. 8, 2022 (TW) ................................. 111121316

(51) Int. Cl.
*A61G 5/04* (2013.01)
*A61H 3/04* (2006.01)

(52) U.S. Cl.
CPC ................. *A61G 5/04* (2013.01); *A61H 3/04* (2013.01); *A61G 2203/20* (2013.01); *A61G 2203/22* (2013.01); *A61G 2203/40* (2013.01); *A61H 2003/043* (2013.01)

(58) Field of Classification Search
CPC .. A61G 5/04; A61G 2203/20; A61G 2203/22; A61G 2203/40; A61H 3/04; A61H 2003/043
USPC .......................................................... 280/210
See application file for complete search history.

(56) References Cited

U.S. PATENT DOCUMENTS

| | | | |
|---|---|---|---|
| 2019/0365592 | A1 | 12/2019 | Norton et al. |
| 2021/0405638 | A1 | 12/2021 | Boyraz et al. |
| 2022/0083769 | A1 | 3/2022 | Nakayama et al. |

FOREIGN PATENT DOCUMENTS

| | | | | |
|---|---|---|---|---|
| CN | 108743086 | | 11/2018 | |
| CN | 108897328 | | 11/2018 | |
| CN | 112869968 | | 6/2021 | |
| CN | 112869969 | A * | 6/2021 | ............... A61G 5/04 |
| CN | 113288608 | | 8/2021 | |
| JP | 2020509476 | | 3/2020 | |
| WO | WO-2020073168 | A1 * | 4/2020 | ............... A61G 5/04 |

OTHER PUBLICATIONS

"Partial Search Report of Europe Counterpart Application", issued on Oct. 27, 2022, pp. 1-13.
"Search Report of Europe Counterpart Application", issued on Feb. 5, 2024, pp. 1-13.

* cited by examiner

*Primary Examiner* — Jacob D Knutson
(74) *Attorney, Agent, or Firm* — J.C. PATENTS

(57) ABSTRACT

A control system and a control method for controlling an electric walking aid device are provided. The control system includes a panoramic camera, a navigation information device, and a controller. The panoramic camera captures a panoramic image around the electric walking aid device. The navigation information device generates navigation information. The controller detects a user according to the panoramic image, and controls the electric walking aid device to approach the user according to the navigation information.

12 Claims, 5 Drawing Sheets

FIMG

IF2

CONTROL SYSTEM AND CONTROL METHOD FOR CONTROLLING ELECTRIC WALKING AID DEVICE

CROSS-REFERENCE TO RELATED APPLICATION

This application claims the priority benefit of Taiwan application serial no. 111121316, filed on Jun. 8, 2022. The entirety of the above-mentioned patent application is hereby incorporated by reference herein and made a part of this specification.

BACKGROUND

Technology Field

This disclosure relates to a control system and a control method, and in particular to a control system and a control method for controlling an electric walking aid device.

Description of Related Art

Electric walking aid devices, such as electric walking aids, electric walking aid chairs, electric lifts, and electric wheelchairs, can assist users with mobility issues to move. However, to use the current electric walking aid device the user must either approach the electric walking aid device by himself/herself or be assisted by a bystander to bring the electric walking aid device closer to the user. This limits the convenience of using the electric walking aid device. Therefore, it is one of the research focuses of the technicians in this field to control the electric walking aid device to actively approach the user to improve the convenience of using the electric walking aid device.

SUMMARY

The disclosure provides a control system and a control method for controlling an electric walking aid device, capable of controlling the electric walking aid device to actively approach a user.

The control system of the disclosure is used to control the electric walking aid device. The control system includes a panoramic camera, a navigation information device, and a controller. The panoramic camera is disposed on the electric walking aid device. The panoramic camera captures a panoramic image around the electric walking aid device. The navigation information device is disposed on the electric walking aid device. The navigation information device generates navigation information. The controller is coupled to the panoramic camera and the navigation information device. The controller detects the user according to the panoramic image, and controls the electric walking aid device to approach the user according to the navigation information.

The control method of the disclosure is used to control the electric walking aid device. The control method includes the followings. A panoramic image around the electric walking aid device is captured through a panoramic camera. Navigation information is generated by a navigation information device. A user is detected according to the panoramic image, and the electric walking aid device is controlled to approach the user according to the navigation information.

Based on the above, the control system and the control method of the disclosure use the panoramic camera to capture the panoramic image around the electric walking aid device, and use the navigation information device to generate the navigation information. The control system and the control method of the disclosure detect the user according to the panoramic image, and control the electric walking aid device to approach the user according to the navigation information. In this way, the convenience of using the electric walking aid device may be improved.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
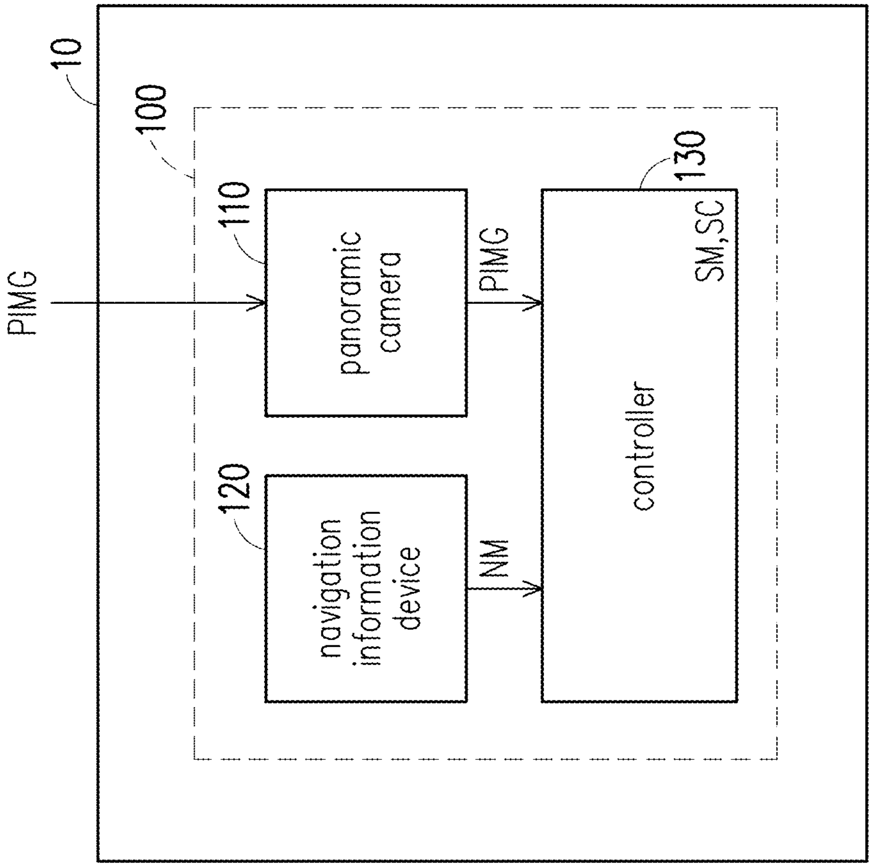
FIG. 1 is a schematic diagram of a control system according to an embodiment of the disclosure.

Referring to FIG. 1, FIG. 1 is a schematic diagram of a control system according to an embodiment of the disclosure. A control system 100 is used to control an electric walking aid device 10. In this embodiment, the electric walking aid device 10 is, for example, an electric walking aid, an electric walking aid chair, an electric lift, an electric wheelchair, and other mobility assistance devices. In this embodiment, the control system 100 includes a panoramic camera 110, a navigation information device 120, and a controller 130. The panoramic camera 110 is disposed on the electric walking aid device 10. The panoramic camera 110 captures a panoramic image PIMG around the electric walking aid device 10. The panoramic image PIMG is a 360° panoramic image around the electric walking aid device 10. For example, the panoramic camera 110 may be realized by multiple image capture circuits with various image capture angles. In this embodiment, the navigation information device 120 is disposed on the electric walking aid device 10. The navigation information device 120 generates navigation information NM.

In this embodiment, the controller 130 is coupled to the panoramic camera 110 and the navigation information device 120. The controller 130 receives the panoramic image PIMG and the navigation information NM. The controller 130 detects a user according to the panoramic image PIMG, and controls the electric walking aid device 10 to approach the user according to the navigation information NM. In this embodiment, the controller 130 provides a control signal SC according to the navigation information NM to control the electric walking aid device 10, so that the electric walking aid device 10 may approach the user. In this embodiment, the controller 130 is, for example, a central processing unit (CPU), or other programmable general purpose or special purpose microprocessor, digital signal processor (DSP), programmable controller, application specific integrated circuit (ASIC), programmable logic device (PLD), or other similar devices, or a combination of the devices, which may load and execute a computer program.

It should be noted that the controller 130 detects the user in the panoramic image PIMG according to the panoramic image PIMG, so as to know the user's position in the panoramic image PIMG. The controller 130 also navigates the electric walking aid device 10 according to the navigation information NM, thereby controlling the electric walking aid device 10 to approach the user. In this way, the convenience of using the electric walking aid device 10 may be improved.

In this embodiment, the controller 130 controls the electric walking aid device 10 to move in a field, so that the navigation information device 120 generates the navigation information NM of the field. The field may be an indoor environment and/or an outdoor environment. In this embodiment, the controller 130 may construct a real-time map SM. For example, the controller 130 may perform simultaneous localization and mapping (SLAM) calculations according to the navigation information NM, so as to provide the real-time map SM for the field. The real-time map SM corresponds to an environment of the field. For example, the real-time map SM records obstacles in the field and spatial information of the electric walking aid device 10 moving freely in the field. The controller 130 may generate the control signal SC based on the real-time map SM and the navigation information NM, know movements of the electric walking aid device 10 in the environment of the field (e.g., current position, speed, etc.), and use the control signal SC to control the movements of the electric walking aid device 10. Further, the controller 130 performs a Visual SLAM operation, thereby providing the real-time map SM for the field. The controller 130 may use the navigation information NM to know a movement status of the electric walking aid device 10 in the real-time map SM or the current position in the field. The movement status includes a direction of a movement and a speed of a movement. Therefore, when the controller 130 knows the movement status of the electric walking aid device 10 in the real-time map SM or the current position in the field, the controller 130 may use the real-time map SM and the navigation information NM to provide the control signal SC, so as to navigate the electric walking aid device 10. In this embodiment, the controller 130 also performs at least one of human detection and joint point detection of the user according to the panoramic image PIMG. For example, the controller 130 recognizes the user through the human detection, and knows the user's position in the panoramic image PIMG. The controller 130 knows the user's posture through the joint point detection, such as standing, sitting, squatting, sleeping or hand raising. For example, the controller 130 obtains multiple joint point coordinates of the user through the joint point detection, uses the joint point coordinates to determine the user's skeleton distribution, and knows the user's posture according to the user's skeleton distribution.

Figure 2:
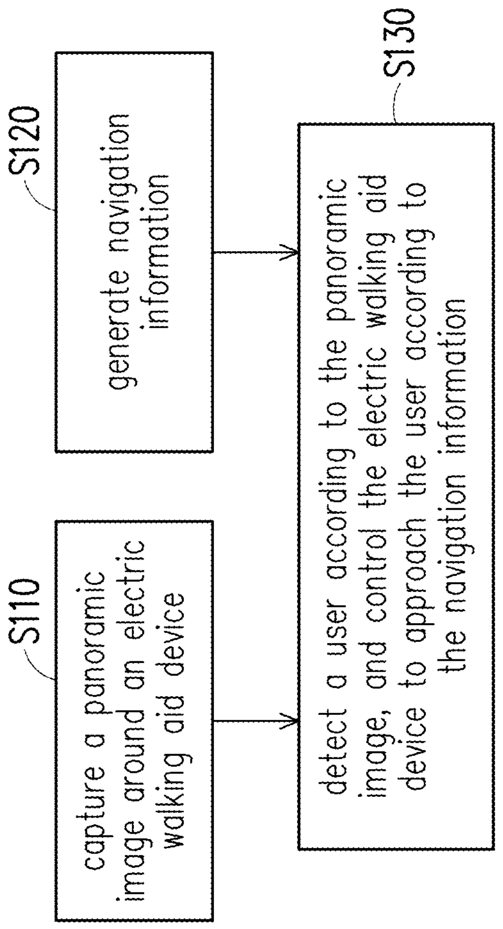
FIG. 2 is a flow chart of a control method according to an embodiment of the disclosure.

Referring to FIG. 1 and FIG. 2 together, FIG. 2 is a flow chart of a control method according to an embodiment of the disclosure. In this embodiment, the control method shown in FIG. 2 is applicable to the electric walking aid device 10. In step S110, the panoramic camera 110 captures the panoramic image PIMG around the electric walking aid device 10. In step S120, the navigation information device 120 generates the navigation information NM. In step S130, the controller 130 detects the user according to the panoramic image PIMG, and controls the electric walking aid device 10 to approach the user according to the navigation information NM. The implementation details of steps S110 to S130 are fully described or taught in the embodiment of FIG. 1, and therefore will not be repeated in the following.

Figure 3:
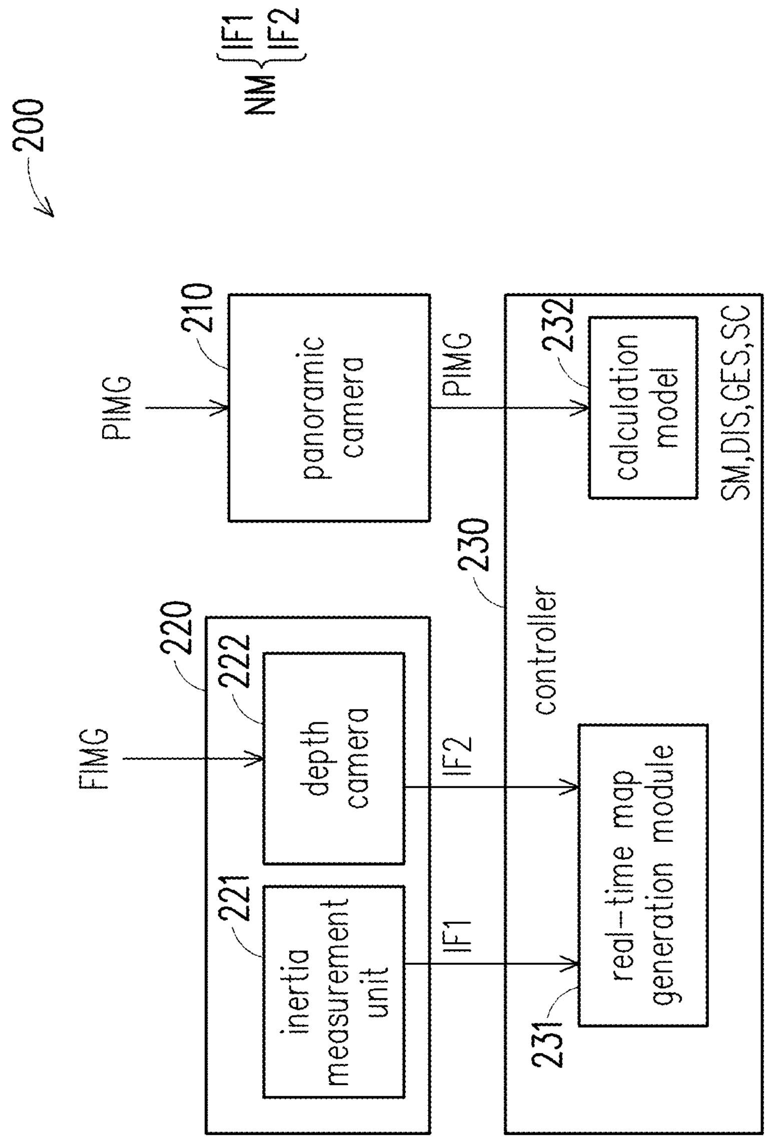
FIG. 3 is a schematic diagram of a control system according to another embodiment of the disclosure.

Referring to FIG. 1 and FIG. 3, FIG. 3 is a schematic diagram of a control system according to another embodiment of the disclosure. In this embodiment, a control system 200 may be used to implement or replace the control system 100. The control system 200 includes a panoramic camera 210, a navigation information device 220, and a controller 230. The panoramic camera 210 captures the panoramic image PIMG around the electric walking aid device 10. The navigation information device 220 includes an inertial measurement unit (IMU) 221 and a depth camera 222. In this embodiment, the navigation information NM includes acceleration information IF1 and point cloud information IF2. The inertial measurement unit 221 obtains the acceleration information IF1 as the electric walking aid device 10 moves in the field. The acceleration information IF1 is associated with a trajectory of the electric walking aid device 10 as it moves in the field. The depth camera 222 generates the point cloud information IF2 of the field.

Figure 4:
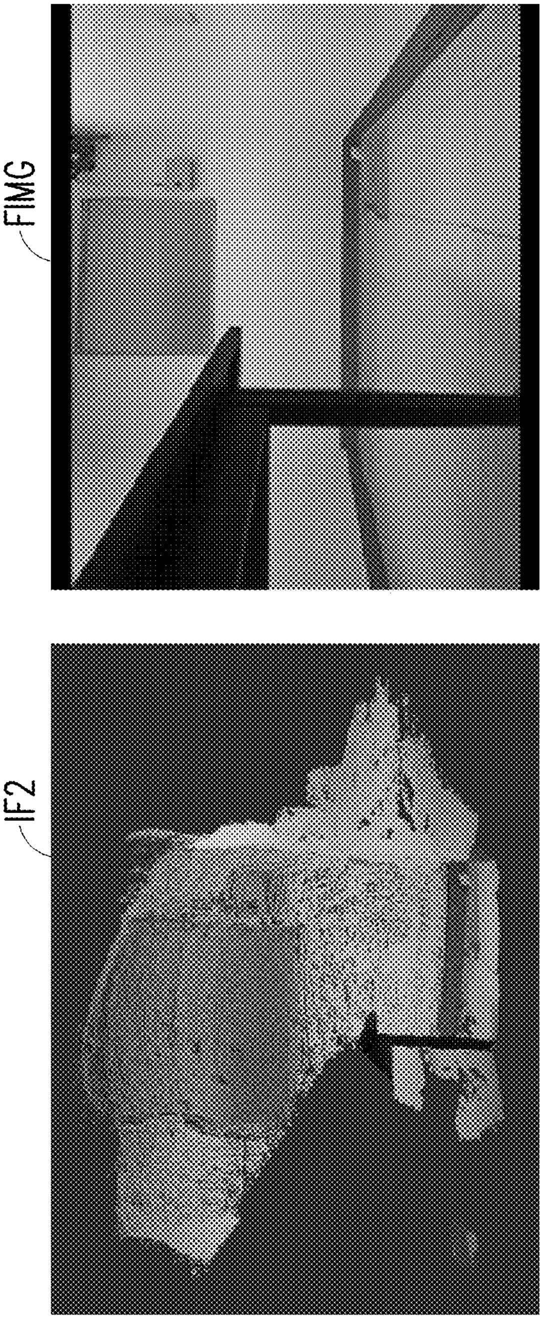
FIG. 4 is a schematic diagram of a comparison of point cloud information and an original image according to an embodiment of the disclosure.

For further explanation, referring to FIG. 3 and FIG. 4 together, FIG. 4 is a schematic diagram of a comparison of point cloud information and an original image according to an embodiment of the disclosure. FIG. 4 shows single point cloud information IF2 and a single original image FIMG. During the movements of the electric walking aid device 10 in the field, the depth camera 222 receives the original image FIMG, and generates the point cloud information IF2 according to the original image FIMG. In this embodiment, the point cloud information IF2 includes a point cloud image corresponding to the original image FIMG of the field. Preferably, the point cloud image includes multiple depth information of multiple feature points.

In this embodiment, the controller 230 includes a real-time map generation module 231 and a calculation model 232. The real-time map generation module 231 receives the acceleration information IF1 and the point cloud information IF2, and creates the real-time map SM according to the acceleration information IF1 and the point cloud information IF2. In this embodiment, the real-time map SM may be created when the electric walking aid device 10 enters the field for the first time. For example, when the electric walking aid device 10 just arrives in the field, the controller 230 may control the electric walking aid device 10 to move in the field, and the navigation information device 220 scans the environment of the field to generate the acceleration information IF1 and the point cloud information IF2, thereby enabling the real-time map generation module 231 to create the real-time map SM. The controller 230 detects the user according to the panoramic image PIMG, and controls the electric walking aid device 10 to approach the user according to the real-time map SM. The calculation model 232 performs the human detection and the joint point detection according to the panoramic image PIMG. Therefore, the controller 230 may know the user's position in the panoramic image PIMG and the user's posture. In this embodiment, the calculation model 232 may include, for example, a YOLO (You only look once) calculation model and an OpenPose human posture recognition model, but the disclosure is not limited thereto. In addition, after knowing the user's position in the panoramic image PIMG, the controller 230 controls the electric walking aid device 10 to approach the user according to the real-time map SM. Based on the real-time map SM, the controller 230 may avoid possible obstacles when approaching the user.

Figure 5:
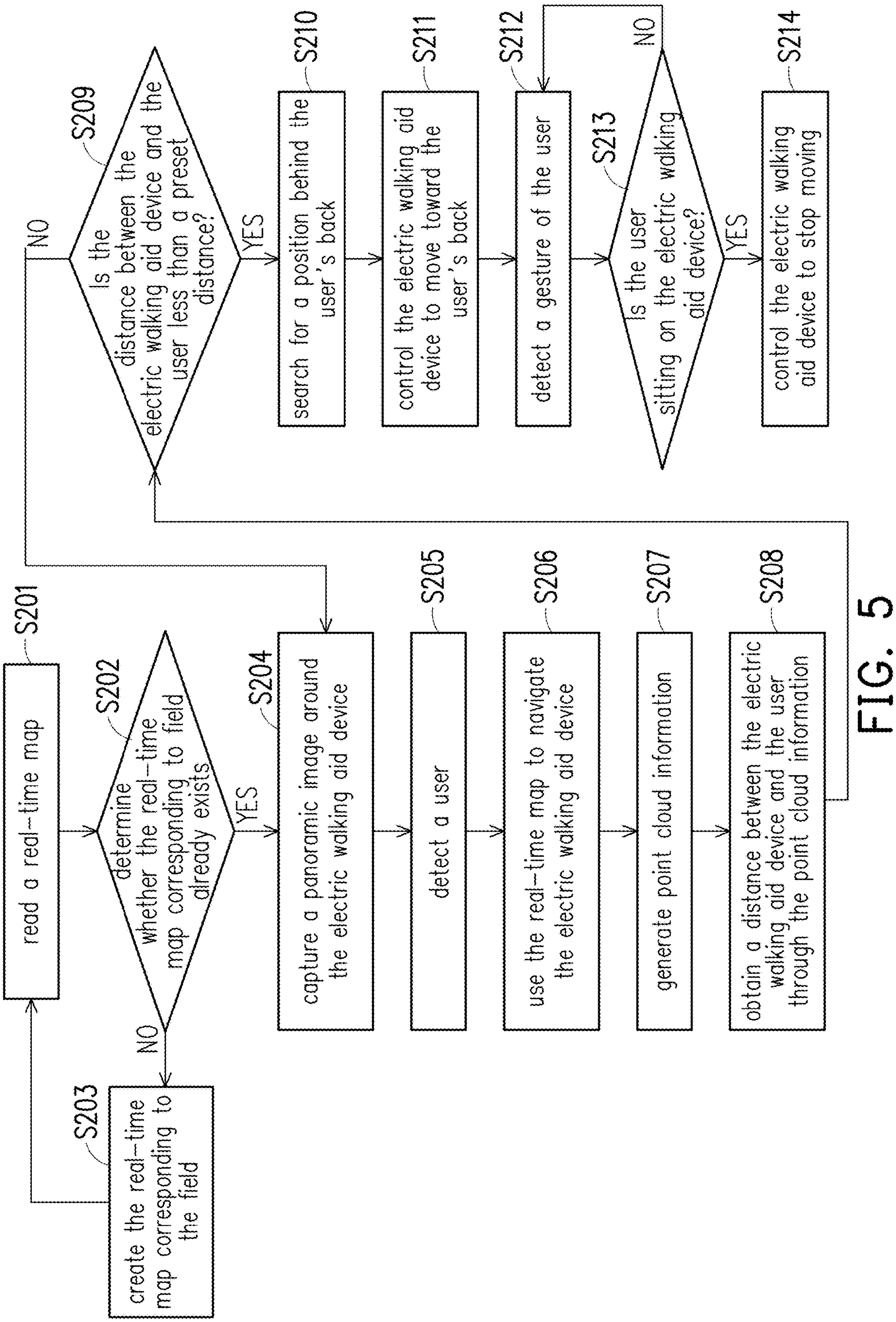
FIG. 5 is a flow chart of a control method according to another embodiment of the disclosure.

Referring to FIG. 3 and FIG. 5 together, FIG. 5 is a flow chart of a control method according to another embodiment of the disclosure. In this embodiment, the control method shown in FIG. 5 is applicable to an electric walking aid device (e.g., the electric walking aid device 10 shown in FIG. 1). In step S201, a loaded real-time map is read. In this embodiment, after a real-time map is loaded, the controller 230 reads the loaded real-time map. In step S202, the controller 230 determines whether the real-time map SM corresponding to the field already exists according to the loaded map. That is, the controller 230 determines whether the loaded map includes the real-time map SM corresponding to the field. In this embodiment, if the controller 230 determines in step S202 that the real-time map SM does not exist, this means that the real-time map SM in the current field has not been created. Therefore, in step S203, the controller 230 creates the real-time map SM corresponding to the field. In this embodiment, the controller 230 may control the electric walking aid device to move in the field, and the navigation information device 220 scans the environment of the field in step S203 to generate the acceleration information IF1 and the point cloud information IF2, thereby enabling the controller 230 to create the real-time map SM corresponding to the field. Next, the newly generated real-time map SM corresponding to the field will be read by the controller 230 in step S201.

If the controller 230 determines in step S202 that the real-time map SM corresponding to the field exists, this means that the real-time map SM in the field has been created. Thus, in step S204, the panoramic camera 210 captures the panoramic image PIMG around the electric walking aid device. In step S205, the controller 230 detects the user's position in the panoramic image PIMG. Next, the controller 230 uses the real-time map SM corresponding to the field to navigate the electric walking aid device in step S206, thereby enabling the electric walking aid device to approach the user.

In step S207, the depth camera 222 continuously generates the point cloud information IF2 during a process of the controller 230 navigating the electric walking aid device. In step S208, the controller 230 obtains a distance DIS between the electric walking aid device and the user through the point cloud information IF2. In step S209, the controller 230 compares a preset distance to the distance DIS between the electric walking aid device and the user. When the distance DIS between the electric walking aid device and the user is greater than or equal to the preset distance, the control method returns to step S204. That is, once the real-time map SM corresponding to the field exists, the control method will perform steps S204 to S209 in a loop until the distance DIS is less than the preset distance. In this embodiment, the preset distance may be set to, for example, 1 meter or tens of centimeters, and the disclosure is not limited thereto.

In step S209, when the distance DIS between the electric walking aid device and the user is less than the preset distance, the controller 230 searches for a position behind the user's back in step S210. In this embodiment, the controller 230 searches for the position behind the user's back according to the panoramic image PIMG in step S210. Further, in step S210, the controller 230 finds out the position behind the user's back according to a detection result of the at least one of the human detection and the joint point detection on the panoramic image PIMG. For example, in step S210, the controller 230 may, for example, use the OpenPose human posture recognition model to perform the joint point detection on the panoramic image PIMG to obtain joint point detection information, and use the YOLO calculation model to perform human detection on the panoramic image PIMG to obtain human detection information. The controller 230 uses an EfficientNet tool to classify information of the user's back. Further, the controller 230 integrates the information of the user's back with the human detection information and the joint point detection information to find out a direction or position of the user's back.

For another example, the controller 230 determines the direction in which the user is facing or facing away according to the detection result of the at least one of the human detection and the joint point detection on the panoramic image PIMG. When the controller 230 determines that the user is facing the electric walking aid device according to the detection result of the at least one of the human detection and the joint point detection, the controller 230 controls the electric walking aid device to go around the user to reach the user's back. When the controller 230 finds out the position behind the user's back, step S211 is proceed.

In step S211, the controller 230 controls the electric walking aid device to move toward the user's back, and detects a gesture GES of the user in step S212. In this embodiment, once the position behind the user's back is confirmed, the controller 230 controls the electric walking aid device to move slowly toward the user's back in step S211, and detects the gesture GES of the user according to the panoramic image PIMG in step S212.

Next, in step S213, the controller 230 determines whether the user is sitting on the electric walking aid device. In this embodiment, the controller determines whether the user is sitting on the electric walking aid device according to the detection result of the at least one of the human detection and the joint point detection. When determining that the user is not sitting on the electric walking aid device, the controller 230 in step S211 controls the electric walking aid device to move toward the user's back. On the other hand, when determining that the user is sitting on the electric walking aid device, the controller 230 in step S214 controls the electric walking aid device to stop moving.

In this embodiment, after step S214, the controller 230 may end the navigation and give control of the electric walking aid device to the user.

In some embodiments, the control system 200 may recognize the user's actions or gestures through the panoramic image PIMG to activate the control method as shown in FIG. 5. For example, the controller 230 determines that the user's gesture matches a preset gesture according to the detection result of the at least one of the human detection and the joint point detection on the panoramic image PIMG (the disclosure is not limited thereto). Thus, the controller 230 starts the control method shown in FIG. 5 according to the preset gesture.

To sum up, the control system and the control method of the disclosure use the panoramic camera to capture the panoramic image around the electric walking aid device and use the navigation information device to generate the navigation information. The control system and the control method of the disclosure detect the user according to the panoramic image, and control the electric walking aid device to approach the user according to the navigation information. In this way, the electric walking aid device may be controlled to approach the user. The convenience of using the electric walking aid device may be improved.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A control system for controlling an electric walking aid device, comprising:

a panoramic camera disposed on the electric walking aid device, configured to capture a panoramic image around the electric walking aid device;

a navigation information device disposed on the electric walking aid device, configured to generate navigation information; and a controller coupled to the panoramic camera and the navigation information device, configured to perform at least one of human detection and joint point detection of a user according to the panoramic image, obtain a distance between the electric walking aid device and the user through point cloud information, and control the electric walking aid device to approach the user according to the navigation information, wherein when the distance is less than a preset distance, the controller searches for a position behind the user's back according to a detection result of the at least one of the human detection and the joint point detection, and controls the electric walking aid device to move toward the user's back, and wherein when the controller determines that the user is facing the electric walking aid device according to the detection result of the at least one of the human detection and the joint point detection, the controller controls the electric walking aid device to go around the user to reach the user's back.

2. The control system according to claim 1, wherein the controller controls the electric walking aid device to move in a field such that the navigation information device generates the navigation information of the field.

3. The control system according to claim 1, wherein the controller knows the user's position in the panoramic image through the human detection, and the controller knows the user's posture through the joint point detection.

4. The control system according to claim 1, wherein the navigation information comprises acceleration information and point cloud information, wherein the navigation information device comprises:

an inertial measurement unit configured to obtain the acceleration information of the electric walking aid device as the electric walking aid device moves in a field; and a depth camera configured to generate the point cloud information of the field.

5. The control system according to claim 4, wherein the controller generates a real-time map according to the point cloud information and the acceleration information, wherein the real-time map corresponds to an environment of the field.

6. The control system according to claim 1, wherein:

the controller determines whether the user is sitting on the electric walking aid device according to a detection result of the at least one of the human detection and the joint point detection, when the controller determines that the user is sitting on the electric walking aid device, the controller controls the electric walking aid device to stop moving, and when the controller determines that the user is not sitting on the electric walking aid device, the controller controls the electric walking aid device to move toward the user's back.

7. A control method for controlling an electric walking aid device, comprising:

capturing a panoramic image around the electric walking aid device by a panoramic camera and performing at least one of human detection and joint point detection of a user according to the panoramic image;

generating navigation information by a navigation information device;

detecting the user according to the panoramic image, and controlling the electric walking aid device to approach the user according to the navigation information;

obtaining a distance between the electric walking aid device and the user through point cloud information;

when the distance between the electric walking aid device and the user is less than the preset distance, searching for a position behind the user's back according to a detection result of the at least one of the human detection and the joint point detection, and controlling the electric walking aid device to move toward the user's back, and when the user is determined to be facing the electric walking aid device according to the detection result of the at least one of the human detection and the joint point detection, controlling the electric walking aid device to go around the user to reach the user's back.

8. The control method according to claim 7, wherein generating the navigation information by the navigation information device comprises:

controlling the electric walking aid device to move in a field such that the navigation information device generates the navigation information of the field.

9. The control method according to claim 7, wherein performing the at least one of the human detection and the joint point detection according to the panoramic image comprises:

knowing the user's position in the panoramic image through the human detection; and knowing the user's posture through the joint point detection.

10. The control method according to claim 7, wherein the navigation information comprises acceleration information and point cloud information, wherein generating the navigation information by the navigation information device comprises:

obtaining the acceleration information as the electric walking aid device moves in a field; and generating the point cloud information of the field.

11. The control method according to claim 10 further comprising:

generating a real-time map according to the point cloud information and the acceleration information, wherein the real-time map corresponds to an environment of the field.

12. The control method according to claim 9 further comprising:

determining whether the user is sitting on the electric walking aid device according to a detection result of the at least one of the human detection and the joint point detection;

controlling the electric walking aid device to stop moving when that the user is sitting on the electric walking aid device is determined; and controlling the electric walking aid device to move toward the user's back when that the user is not sitting on the electric walking aid device is determined.

* * * * *